(12) United States Patent
Kuwata

(10) Patent No.: US 9,253,411 B2
(45) Date of Patent: Feb. 2, 2016

(54) IMAGE PROCESSING APPARATUS, IMAGE PROCESSING METHOD AND IMAGE COMMUNICATION SYSTEM

(71) Applicant: Kohji Kuwata, Kanagawa (JP)

(72) Inventor: Kohji Kuwata, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 152 days.

(21) Appl. No.: 14/452,947

(22) Filed: Aug. 6, 2014

(65) Prior Publication Data

US 2015/0049220 A1 Feb. 19, 2015

(30) Foreign Application Priority Data

Aug. 15, 2013 (JP) ................................. 2013-168894

(51) Int. Cl.
*H04N 5/20* (2006.01)
*H04N 5/232* (2006.01)
*G06T 5/00* (2006.01)
*G06T 3/00* (2006.01)
*H04N 5/357* (2011.01)

(52) U.S. Cl.
CPC .......... *H04N 5/23296* (2013.01); *G06T 3/0062* (2013.01); *G06T 5/006* (2013.01); *H04N 5/23238* (2013.01); *H04N 5/3572* (2013.01)

(58) Field of Classification Search
CPC ............ H04N 5/23238; H04N 5/2628; H04N 21/4728; H04N 5/23296; H04N 5/23216; H04N 21/21805; G06T 3/0018; G06T 2207/20132; G06T 2207/20182; G06T 5/003; G06T 5/006; G06F 17/30017; G06F 17/30056
See application file for complete search history.

(56) References Cited

U.S. PATENT DOCUMENTS

| 8,264,524 | B1* | 9/2012 | Davey | 348/36 |
| 2005/0007478 | A1* | 1/2005 | Ahiska | 348/335 |
| 2005/0212913 | A1* | 9/2005 | Richter | 348/170 |
| 2006/0056056 | A1* | 3/2006 | Ahiska et al. | 359/690 |
| 2008/0232697 | A1* | 9/2008 | Chen et al. | 382/225 |
| 2009/0128686 | A1* | 5/2009 | Yamashita et al. | 348/369 |
| 2009/0284601 | A1* | 11/2009 | Eledath et al. | 348/157 |
| 2010/0002070 | A1* | 1/2010 | Ahiska | 348/36 |

(Continued)

FOREIGN PATENT DOCUMENTS

| JP | 2010-239221 | 10/2010 |
| JP | 2012-080518 | 4/2012 |

OTHER PUBLICATIONS

U.S. Appl. No. 14/194,959, filed Mar. 3, 2014.

*Primary Examiner* — Jingge Wu
(74) *Attorney, Agent, or Firm* — Oblon, McClelland, Maier & Neustadt, L.L.P

(57) ABSTRACT

An image processing apparatus includes a region clipping unit configured to clip an interest image of a region of interest from a captured image captured by an image capturing unit using a wide-angle lens, a distortion correcting unit configured to correct distortion, which is caused by image capture using the wide-angle lens, of the interest image by transforming coordinate data from captured image space to corrected image space, an image-capture control unit configured to control the image capturing unit so as to perform image capture at a zoom ratio, which makes number of coordinate data sets per unit area of the interest image equal to or larger than a predetermined value, of the wide-angle lens, and a distortion-correction control unit configured to control the distortion correcting unit so as to correct the distortion of the interest image captured at the zoom ratio.

8 Claims, 4 Drawing Sheets

(56) References Cited

U.S. PATENT DOCUMENTS

| | | |
|---|---|---|
| 2010/0002071 A1* | 1/2010 | Ahiska .............................. 348/36 |
| 2010/0053335 A1* | 3/2010 | Hong et al. .................... 348/180 |
| 2010/0134621 A1* | 6/2010 | Namkoong et al. ........... 348/143 |
| 2011/0237882 A1* | 9/2011 | Saito .............................. 600/109 |
| 2011/0258344 A1* | 10/2011 | Mukherjee et al. ............ 709/247 |
| 2012/0019660 A1* | 1/2012 | Golan et al. .................... 348/144 |
| 2012/0056975 A1 | 3/2012 | Yamashita et al. |
| 2012/0093361 A1* | 4/2012 | Huang et al. ................... 382/103 |
| 2013/0258048 A1* | 10/2013 | Wang et al. ...................... 348/38 |
| 2014/0369625 A1* | 12/2014 | Lin et al. ......................... 382/275 |

\* cited by examiner

IMAGE PROCESSING APPARATUS, IMAGE PROCESSING METHOD AND IMAGE COMMUNICATION SYSTEM

CROSS-REFERENCE TO RELATED APPLICATION(S)

The present application claims priority to and incorporates by reference the entire contents of Japanese Patent Application No. 2013-168894 filed in Japan on Aug. 15, 2013.

BACKGROUND OF THE INVENTION

1. Field of the Invention

The present invention relates generally to an image forming apparatuses, an image forming method, and an image communication system.

2. Description of the Related Art

Known methods for obtaining an image captured in a desired image-capture direction include mechanical methods and electronic methods. To obtain an image captured in a desired image-capture direction with a mechanical method, a camera unit is rotated in the desired image-capture direction using a pan/tilt mechanism. By contrast, to obtain an image captured in a desired image-capture direction with an electronic method, a region corresponding to the image-capture direction is cut out from an image captured by a camera unit using a wide-angle lens. The image captured in the desired image-capture direction can thus be obtained without rotating the camera unit. The captured image can be digitally enlarged or reduced. Such an electronic (digital) method can be regarded as a virtual pan/tilt/zoom (PTZ) feature.

Japanese Laid-open Patent Application No. 2010-239221 discloses an image communication system aimed at reducing degradation in image quality resulting from distortion correction applied to correct distortion of an image caused by image capture using an ultrawide-angle lens. The image communication system operates as follows. A camera clips a region of interest (ROI) from a captured image produced using an ultrawide-angle lens, and transmits coded data of the ROI to a terminal device. The terminal device decodes the coded data and performs a distortion correcting process on the data. The distortion correcting process is a process of correcting large distortion of the ultrawide-angle lens to thereby generate an image similar to an image captured using a normal camera. The distortion correcting process corrects distortion caused by image capture using the ultrawide-angle lens by performing coordinate transformation from captured-image space to corrected-image space.

Wide-angle lenses such as ultrawide-angle lenses have a characteristic that the number of coordinate data sets per unit area of a not-yet-corrected captured image, on which coordinate transformation is to be performed, varies with distance from an image center portion of the captured image. An encoding unit allocates an amount of coded data to each of encoding blocks in an ROI depending on a distance from the image center portion of the captured image to the encoding block. This operation is performed to reduce degradation in image quality in the captured image on which the distortion correcting process has been performed.

However, the image communication system disclosed in Japanese Laid-open Patent Application No. 2010-239221 does not take characteristics of projection of an ultrawide-angle lens or a fisheye lens into consideration and allocates coded data amounts to encoding blocks in a region without taking such lens characteristics into consideration.

This will be described more specifically below. Examples of known projection of an ultrawide-angle lens or a fisheye lens include orthogonal projection and equidistant projection. Such projection of an ultrawide-angle lens or a fisheye lens allows capturing an image with a considerably wide angle of view. However, distortion which is not present in an image captured using a normal lens is present in an image captured using an ultrawide-angle lens or a fisheye lens.

Distortion correction of an image captured using an ultrawide-angle lens may be implemented by coordinate transformation from distorted, captured image space to corrected image space. Meanwhile, a subject in a captured image is squeezed more in a radial direction as the distance from an image center portion increases. As for coordinate transformation, the number of coordinate data sets (i.e., the number of reference data sets) per unit area of a not-yet-corrected captured image, on which the coordinate transformation is to be performed, is not uniform in captured image space but decreases with the distance from the image center portion. Thus, the original amount of data is small in a portion away from the image center portion; furthermore, the amount of data is further reduced by an encoding process. As a result, image quality of a distortion-corrected image is disadvantageously degraded.

Therefore, it is desirable to provide an image forming apparatuses, an image forming method, and an image communication system that can reduce degradation in image quality caused by distortion correction applied to an image captured using a wide-angle lens.

SUMMARY OF THE INVENTION

It is an object of the present invention to at least partially solve the problems in the conventional technology.

According to an aspect of the present invention, there is provided an image processing apparatus including: a region clipping unit configured to clip an interest image of a region of interest from a captured image captured by an image capturing unit using a wide-angle lens; a distortion correcting unit configured to correct distortion of the interest image, the distortion being caused by image capture using the wide-angle lens, by transforming coordinate data from captured image space to corrected image space; an image-capture control unit configured to control the image capturing unit so as to perform image capture at a zoom ratio of the wide-angle lens, the zoom ratio making number of coordinate data sets per unit area of the interest image equal to or larger than a predetermined value; and a distortion-correction control unit configured to control the distortion correcting unit so as to correct the distortion of the interest image captured at the zoom ratio.

According to another aspect of the present invention, there is provided an image processing method including: clipping, by a region clipping unit, an interest image of a region of interest from a captured image captured by an image capturing unit using a wide-angle lens; correcting, by a distortion correcting unit, distortion of the interest image, the distortion being caused by image capture using the wide-angle lens, by transforming coordinate data from captured image space to corrected image space; controlling, by an image-capture control unit, the image capturing unit so as to perform image capture at a zoom ratio of the wide-angle lens, the zoom ratio making number of coordinate data sets per unit area of the interest image equal to or larger than a predetermined value; and controlling, by a distortion-correction control unit, the distortion correcting unit so as to correct the distortion of the interest image captured at the zoom ratio.

According to still another aspect of the present invention, there is provided An image communication system including: an image capturing unit configured to capture a captured image using a wide-angle lens; a region clipping unit configured to clip an interest image of a region of interest from the captured image; a distortion correcting unit configured to correct distortion of the interest image, the distortion being caused by image capture using the wide-angle lens, by transforming coordinate data from captured image space to corrected image space; an image-capture control unit configured to control the image capturing unit so as to perform image capture at a zoom ratio of the wide-angle lens, the zoom ratio making number of coordinate data sets per unit area of the interest image equal to or larger than a predetermined value; a distortion-correction control unit configured to control the distortion correcting unit so as to correct the distortion of the interest image captured at the zoom ratio; an encoding unit configured to encode the interest image the distortion of which has been corrected; and a transmission unit configured to transmit the coded interest image to other equipment via a predetermined network.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings. The embodiments are examples of an image communication system configured to provide a virtual pan/tilt/zoom feature using an ultrawide-angle lens or a fisheye lens. The invention is applicable to image communication systems and image processing apparatuses including an image capturing device such as a camera or a video camera. The image communication system is an example of "image processing apparatus".

Overview

Figure 1:
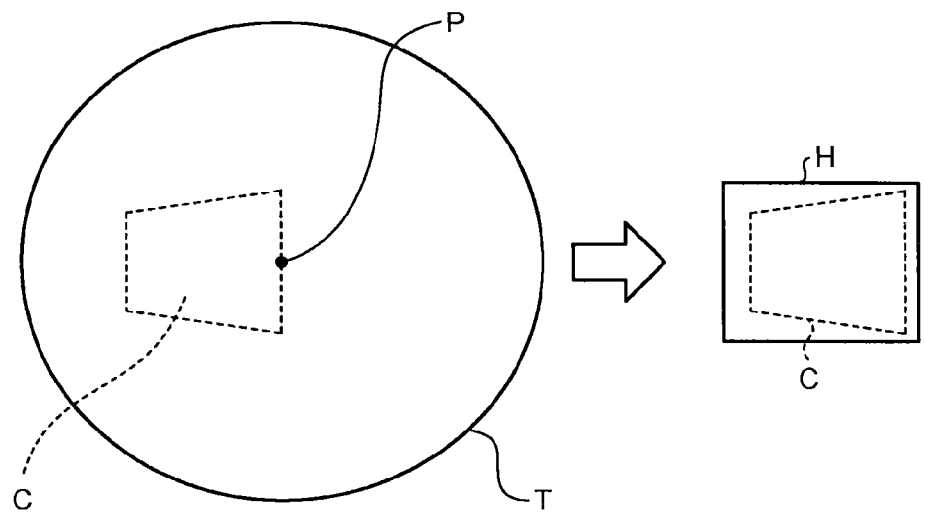
FIG. 1 is a diagram for describing a conventional distortion correcting process.

When an image is captured using a wide-angle lens such as an ultrawide-angle lens or a fisheye lens, an amount of data in the captured image decreases with distance from an image center portion of the captured image due to the influence of lens characteristics as illustrated in FIG. 1, where the amount of data is small in regions away from an image center portion P of a non-zoom captured image (hereinafter, sometimes referred to as "non-zoom image") T. When distortion correction is applied to a captured image (hereinafter, sometimes referred to as "interest image") C of a region of interest (ROI) by exploiting digital magnification, a resultant distortion-corrected captured image H is degraded in image quality.

Figure 2:
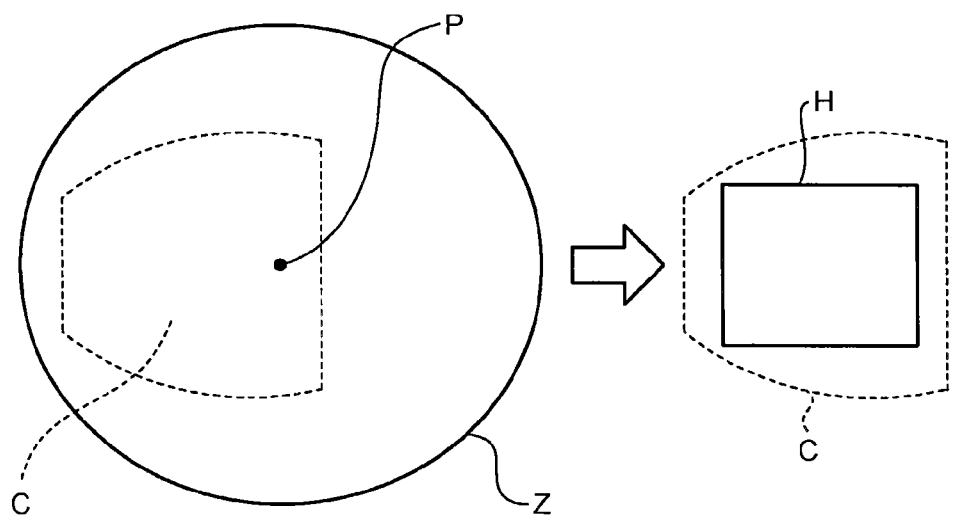
FIG. 2 is a diagram for describing a distortion correcting process of an image communication system according to an embodiment.

To overcome this disadvantage, the image communication system according to the embodiment applies optical zooming to a captured image as preprocessing of distortion correction to thereby obtain a zoomed captured image Z illustrated in FIG. 2 which is optically increased in data amount. The image communication system cuts out (clips) an ROI from the zoomed captured image Z to thereby obtain the ROI captured image (hereinafter, sometimes referred to as the "ROI image") C which is optically increased in data amount. The clipped ROI captured image C has been enlarged by optical zooming. For this reason, distortion correction is applied to the clipped ROI captured image C mainly through interpolation. The operations described above allow minimizing digital magnification, thereby reducing degradation in image quality of the distortion-corrected captured image H.

In other words, the image communication system according to the embodiment optically maximizes the amount of data of the non-zoom captured image T, which is original data, thereby minimizing magnification (magnification ratio) in distortion correction and reducing degradation in image quality of the distortion-corrected captured image H.

Figure 3:
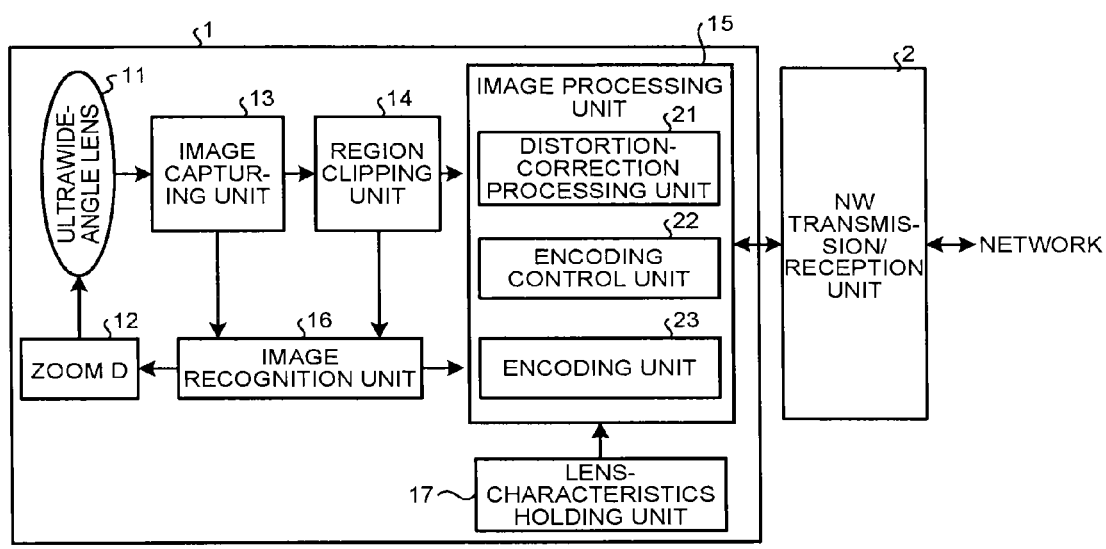
FIG. 3 is a system configuration diagram of the image communication system according to the embodiment.

FIG. 3 is a system configuration diagram of the image communication system according to the embodiment. Units of the image communication system illustrated in FIG. 3 may be implemented either by hardware or by software. Alternatively, the units may be implemented by hardware and software. The image communication system includes a camera unit 1 and a network transmission/reception unit (NW transmission/reception unit) 2. The NW transmission/reception unit 2 transfers ROI image data encoded by an image processing unit 15, which will be described later, via a network such as the Internet or a local area network (LAN) to a destination terminal device. The NW transmission/reception unit 2 is an example of "transmission unit".

The camera unit 1 includes an ultrawide-angle lens 11, a zoom driver (zoom D) 12, an image capturing unit 13, a region clipping unit 14, the image processing unit 15, an image recognition unit 16, and a lens-characteristics holding unit 17. The zoom driver 12 and the image recognition unit 16 are an example of "image-capture control unit". The image capturing unit 13 includes a charge coupled device (CCD) such as a CCD image sensor or a complementary metal-oxide semiconductor (CMOS) sensor and generates an electrical image signal (captured image) from an optical image obtained using the ultrawide-angle lens 11. The region clipping unit 14 cuts out (clips), from the captured image generated by the image capturing unit 13, a captured image of a region of interest (ROI) defined by, for example, an operator.

The image processing unit 15 includes a distortion-correction processing unit 21, an encoding control unit 22, and an encoding unit 23. In the image processing unit 15, the encoding control unit 22 controls the encoding unit 23 to thereby encode the ROI captured image clipped by the region clipping unit 14. The distortion-correction processing unit 21 is an example of "distortion-correction control unit".

The image processing unit 15 has, as an image processing mode, a "first mode" where a distortion correcting process and an encoding process are performed by the image communication system. The image processing unit 15 also has a "second mode" where the image communication system does not perform the distortion correcting process but performs only the encoding process on a captured image; the coded captured image is transmitted to a destination terminal device; the terminal device applies distortion correction to the coded captured image.

When the amount of data of the ROI captured image is sufficiently large, the first mode is selected. The first mode does not require per-macroblock-basis coded-data-amount control involved in the second mode which is described below.

When the amount of ROI data is insufficient, the second mode is selected. When the second mode is selected, the encoding control unit 22 controls allocation of amount of coded data to each of encoding blocks (macroblocks) in the ROI using a compression algorithm, e.g., moving picture experts group (MPEG). (In other words, the encoding control unit 22 controls encoding property.) More specifically, the encoding control unit 22 controls the amount of coded data to be allocated to each of the encoding blocks depending on the distance from the encoding block to a center of the captured image.

The lens-characteristics holding unit 17 stores lens characteristics of the ultrawide-angle lens 11. The distortion-correction processing unit (or referred to as "distortion correcting unit") 21 generates a parameter for use in controlling an amount of distortion correction using the lens characteristics stored in the lens-characteristics holding unit 17. The encoding control unit 22 performs the coded-data-amount control for the encoding unit 23 using the lens characteristics stored in the lens-characteristics holding unit 17.

The image recognition unit 16 calculates a zoom ratio which, for example, maximizes a captured image to be clipped by the region clipping unit 14 based on information about the whole image captured by the image capturing unit 13 and information about the ROI defined by the operator. The image recognition unit 16 supplies a zoom-ratio control signal indicating the calculated zoom ratio to the zoom driver 12. The zoom driver 12 controls a zoom ratio of the ultrawide-angle lens 11 according to the zoom-ratio control signal. The operations described above allow obtaining a captured image, which contains the ROI, optically enlarged at the calculated zoom ratio.

On the other hand, if the image recognition unit 16 determines that zooming will not yield the effect of increasing the data amount as will be described later, the image recognition unit 16 issues a command to the image processing unit 15 to perform only the encoding process and not to perform the distortion correcting process. In this case, the distortion correcting process is performed by the destination terminal device. The terminal device is an example of "other equipment". Upon receiving this command, the encoding control unit 22 increases the amount of coded data allocated to each of encoding blocks in the ROI depending on the distance from the encoding block to an image center portion of a non-zoom captured image, thereby reducing degradation in image quality.

Figure 4:
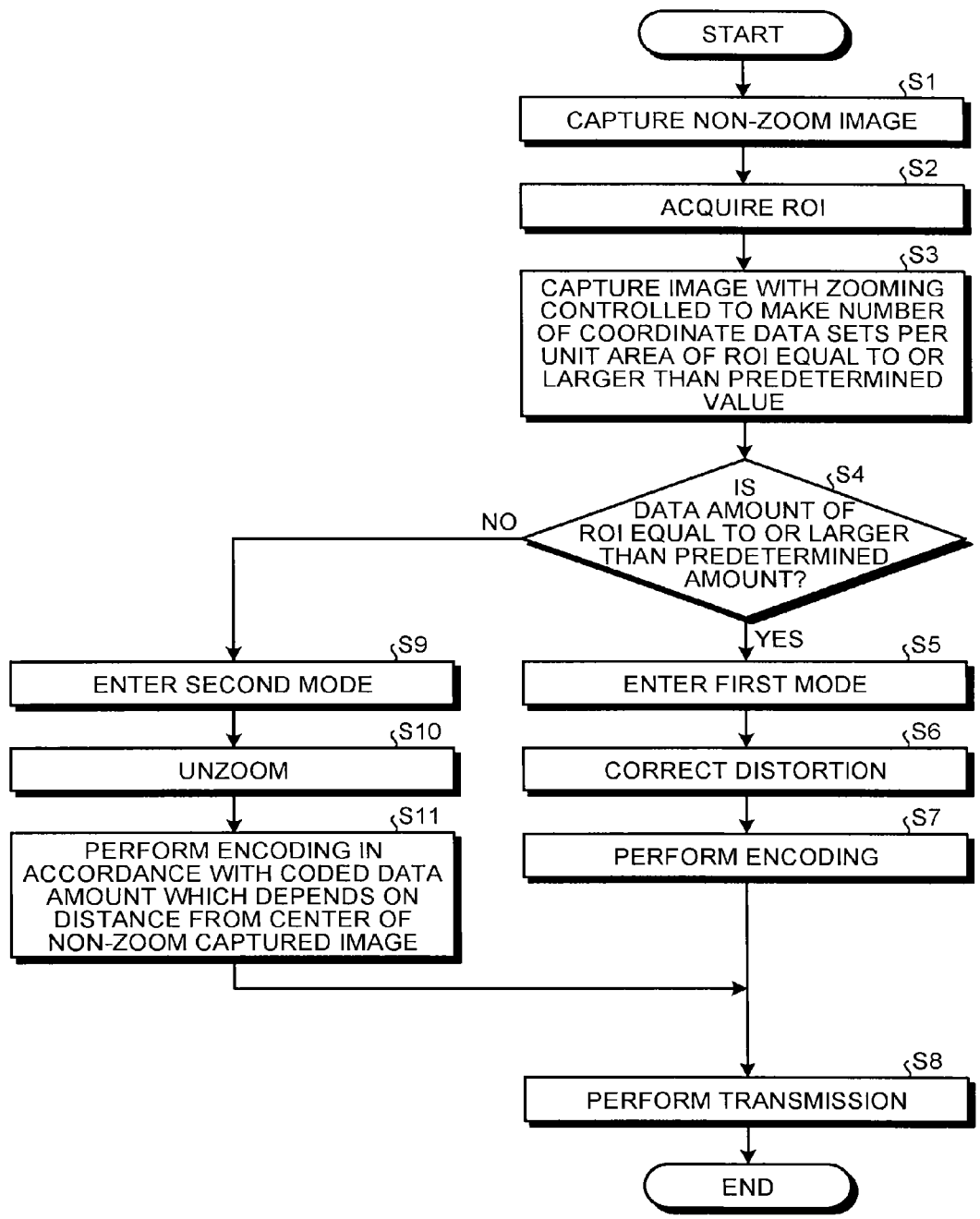
FIG. 4 is a flowchart illustrating a sequence of image transmission operations of the image communication system according to the embodiment.

The flowchart of FIG. 4 illustrates a sequence of image transmission operations of the image communication system according to the embodiment. First, in Step S1, the image recognition unit 16 supplies a zoom-ratio control signal indicating a zoom ratio of 1× to the zoom driver 12. The zoom driver 12 controls the ultrawide-angle lens 11 to the zoom ratio of 1×. The image capturing unit 13 captures the non-zoom captured image T illustrated in FIG. 1 in this manner. The image capturing unit 13 supplies the non-zoom captured image T to the image recognition unit 16. The image recognition unit 16 temporarily stores the non-zoom captured image T.

Subsequently, in Step S2, the image recognition unit 16 obtains information specifying an ROI to be clipped from the non-zoom captured image T. For example, when an ROI is manually defined by a user on the non-zoom captured image T displayed on a display unit, coordinate data indicating the defined ROI is set in the region clipping unit 14. The region clipping unit 14 holds the coordinate data indicating the defined ROI and, in addition, transmits the coordinate data to the image recognition unit 16. The image recognition unit 16 obtains the coordinate data indicating the ROI transmitted from the region clipping unit 14. Alternatively, coordinate data indicating one or more predetermined regions may be automatically obtained as coordinate data indicating the ROI.

Subsequently, in Step S3, the image recognition unit 16 supplies a zoom-ratio control signal indicating a zoom ratio which makes (for example, maximizes) the number of coordinate data sets per unit area of the acquired ROI equal to or larger than a predetermined value to the zoom driver 12. The zoom driver 12 controls the ultrawide-angle lens 11 to the zoom ratio described above. Accordingly, the image capturing unit 13 captures the zoomed captured image Z illustrated in FIG. 2. The image capturing unit 13 supplies the zoomed captured image Z to the image recognition unit 16. The image recognition unit 16 temporarily stores the zoomed captured image Z.

Subsequently, in Step S4, the image recognition unit 16 analyzes positional relationship between the zoomed captured image Z and the ROI captured image C based on corresponding coordinate data. The image recognition unit 16 determines, based on a result of the analysis, whether the amount of the data of the ROI captured image C is equal to or larger than a predetermined amount when image capture is performed at the zoom ratio. If the ROI captured image C is enclosed within the zoomed captured image Z as illustrated in FIG. 2, the data amount of the ROI captured image C is equal to or larger than the predetermined amount. In this case (Yes in Step S4), processing proceeds to Step S5 and the image recognition unit 16 causes the image processing unit 15 to enter the first mode where distortion correction is applied.

Figure 5:
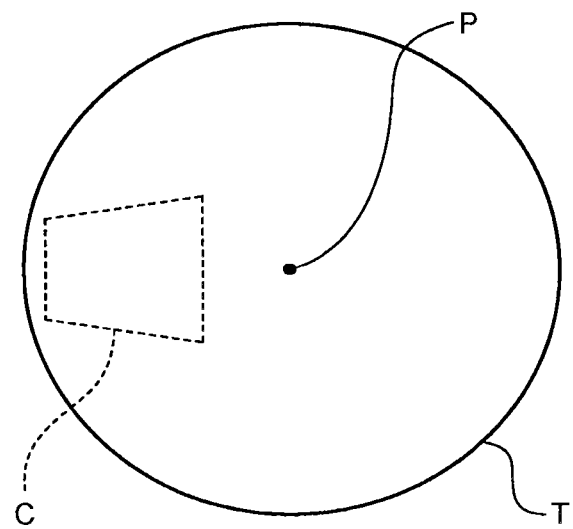
FIG. 5 is a diagram illustrating how the amount of data in an ROI decreases when a zoomed captured image is obtained at a zoom ratio.
Figure 5:
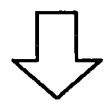
Figure 5:
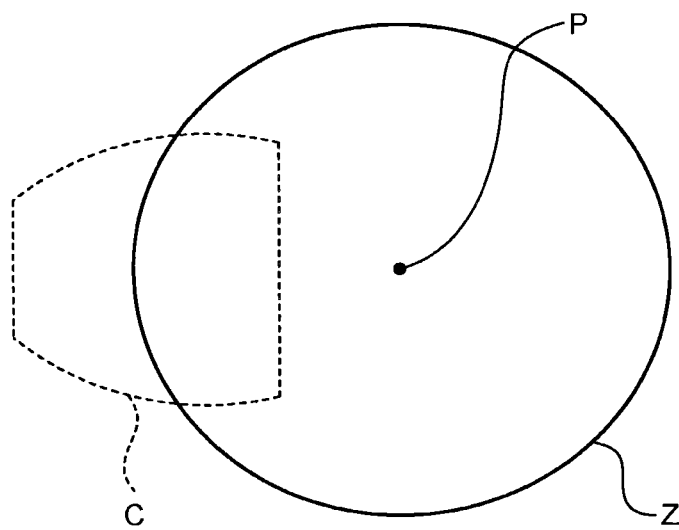

On the other hand, if the ROI captured image C extends out of the zoomed captured image Z as illustrated in FIG. 5, data of an image portion lying out of the zoomed captured image Z is lost. As a result, the data amount of the ROI captured image C becomes smaller than the predetermined amount. In this case (No in Step S4), processing proceeds to Step S9 and the image recognition unit 16 causes the image processing unit 15 to enter the second mode where the encoding process is performed but the distortion correction is not applied.

Upon entering the first mode, in Step S6, the distortion-correction processing unit 21 performs a distortion correcting process on the ROI captured image C as illustrated in FIG. 2 by transforming coordinate data from captured image space to corrected image space as disclosed in, for example, Japanese Laid-open Patent Application No. 2010-239221. As a result, large distortion of the ultrawide-angle lens is corrected, and the distortion-corrected captured image H similar to an image captured by a camera with a normal lens can be produced.

The ROI captured image C has been enlarged by optical zooming. For this reason, distortion correction can be applied to the ROI captured image C mainly through interpolation. Accordingly, because digital magnification can be minimized, degradation in image quality of the distortion-corrected captured image H can be reduced.

Subsequently, in Step S7, the encoding control unit 22 and the encoding unit 23 encode the distortion-corrected captured image H. The coded distortion-corrected captured image H is supplied from the image processing unit 15 to the NW transmission/reception unit 2 and, in Step S8, transmitted by the NW transmission/reception unit 2 to the terminal device via the network.

On the other hand, if it is determined that the amount of the data of the ROI captured image C will be smaller than the predetermined amount if image capture is performed at the zoom ratio described above and the image processing unit 15 enters the second mode, the image recognition unit 16 performs unzooming in Step S10. More specifically, the image recognition unit 16 supplies a zoom-ratio control signal indicating the zoom ratio of 1× to the zoom driver 12. The zoom driver 12 controls the ultrawide-angle lens 11 to the zoom ratio of 1×.

Upon entering the second mode, in Step S11, the encoding control unit 22 controls allocation of the amount of coded data to each of the encoding blocks in the ROI captured image C (see FIG. 1) of the non-zoom captured image T stored in the image recognition unit 16. More specifically, the encoding control unit 22 controls the amount of coded data allocated to each of the encoding blocks in the ROI captured image C depending on the distance from the encoding block to the image center portion P of the non-zoom captured image T.

Put another way, the image processing unit 15 enters the second mode in a case where optical zooming will not increase the data amount of the ROI captured image C. Accordingly, in the second mode, the distortion correcting process is not performed, and each of the encoding blocks in the ROI captured image C is encoded so as to have the coded data amount which is allocated to the encoding block depending on the distance from the image center portion P. The operations described above allow reducing degradation in image quality of the distortion-corrected captured image H even in a case where optical zooming will not yield the effect described above.

The coded ROI captured image C is supplied from the image processing unit 15 to the NW transmission/reception unit 2 and, in Step S8, transmitted by the NW transmission/reception unit 2 to the terminal device. The terminal device performs the distortion correcting process on the ROI captured image C encoded in the second mode.

As is apparent from the above description, the image communication system according to the embodiment defines an ROI in a captured image obtained by capturing a subject using the ultrawide-angle lens 11. The image communication system then captures an image of the subject with a zoom ratio of the ultrawide-angle lens 11 controlled so as to make (for example, maximize) the number of coordinate data sets per unit area of the ROI equal to or larger than the predetermined value. As a result, an optically-enlarged captured image of the subject can be obtained.

Subsequently, an ROI captured image contained in the optically-enlarged subject captured image is detected. When the amount of data of the ROI captured image is equal to or larger than a predetermined amount, the image processing unit 15 enters the first mode where distortion correction is applied. When the amount of data of the ROI captured image is smaller than the predetermined amount, the image processing unit 15 enters the second mode where distortion correction is not applied.

In the first mode, the ROI captured image is clipped from the optically-enlarged subject captured image; distortion correction is applied to the clipped ROI captured image; the distortion-corrected ROI captured image is transmitted to a terminal device. Due to the characteristics of wide-angle lenses, the amount of data per unit area (which corresponds to resolution of the corrected image) is small in a portion away from an image center portion of the captured image. Accordingly, applying distortion correction to this portion leads to degradation in image quality. However, the degradation in image quality of a distortion-corrected captured image can be reduced by capturing a subject using the optical zoom feature to thereby increase the data amount of the ROI. Thus, degradation in image quality which will be caused by distortion correction applied to an image captured using a wide-angle lens such as an ultrawide-angle lens or a fisheye lens can be reduced.

By contrast, in the second mode, distortion correction is not applied because the data amount of the ROI captured image is smaller than the predetermined amount. In this case, each of encoding blocks in the ROI captured image is encoded so as to have a coded data amount which is allocated to the encoding block depending on a distance from an image center portion of a non-zoom captured image. Distortion correction is applied by the terminal device. The operations described above allow reducing degradation in image quality of the distortion-corrected captured image through an approach different from optical zooming.

According to aspects of the embodiments, a disadvantage that applying distortion correction to an image captured using a wide-angle lens can degrade image quality can be reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
circuitry configured to
clip an interest image of a region of interest from a captured image captured by an image capturing device using a wide-angle lens,
correct distortion of the interest image, the distortion being caused by image capture using the wide-angle lens, by transforming coordinate data from captured image space to corrected image space,
control the image capturing device so as to perform image capture at a zoom ratio of the wide-angle lens, the zoom ratio making number of coordinate data sets per unit area of the interest image equal to or larger than a predetermined value, and
determine whether to perform correction to correct the distortion of the interest image captured at the zoom ratio, based on a determination of whether the number of coordinate data sets per unit area of the interest image of the captured image is equal to or larger than the predetermined value when image capture is performed at the zoom ratio.

2. The image processing apparatus according to claim 1, wherein the circuitry is further configured to encode the interest image after distortion has been corrected.

3. The image processing apparatus according to claim 2, wherein the circuitry is further configured to, in response to determining that the number of coordinate data sets per unit area of the interest image of the captured image is not equal to or larger than the predetermined value when image capture is performed at the zoom ratio, perform encoding by allocating an amount of encoded data to each of encoding blocks in the interest image, the amount depending on a distance from an image center portion of a non-zoom image captured by the image capturing device to the each of encoding blocks in the interest image.

4. The image processing apparatus according to claim 1, wherein the circuitry is configured to control the image capturing device so as to perform image capture at a zoom ratio of the wide-angle lens, the zoom ratio maximizing the number of coordinate data sets per unit area of the interest image.

5. An image processing method comprising:
- clipping an interest image of a region of interest from a captured image captured by an image capturing device using a wide-angle lens;
- correcting distortion of the interest image, the distortion being caused by image capture using the wide-angle lens, by transforming coordinate data from captured image space to corrected image space;
- controlling the image capturing device so as to perform image capture at a zoom ratio of the wide-angle lens, the zoom ratio making number of coordinate data sets per unit area of the interest image equal to or larger than a predetermined value; and
- determining whether to perform correction to correct the distortion of the interest image captured at the zoom ratio, based on a determination of whether the number of coordinate data sets per unit area of the interest image of the captured image is equal to or larger than the predetermined value when image capture is performed at the zoom ratio.

6. An image communication system comprising:
- an image capturing unit configured to capture a captured image using a wide-angle lens;
- a region clipping unit configured to clip an interest image of a region of interest from the captured image;
- a distortion correcting unit configured to correct distortion of the interest image, the distortion being caused by image capture using the wide-angle lens, by transforming coordinate data from captured image space to corrected image space;
- an image-capture control unit configured to control the image capturing unit so as to perform image capture at a zoom ratio of the wide-angle lens, the zoom ratio making number of coordinate data sets per unit area of the interest image equal to or larger than a predetermined value;
- a distortion-correction control unit configured to determine whether to control the distortion correcting unit so as to correct the distortion of the interest image captured at the zoom ratio, based on a determination of whether the number of coordinate data sets per unit area of the interest image of the captured image is equal to or larger than the predetermined value when image capture is performed at the zoom ratio;
- an encoding unit configured to encode the interest image the distortion of which has been corrected; and
- a transmission unit configured to transmit the coded interest image to other equipment via a predetermined network.

7. The image communication system according to claim 6, further comprising an encoding control unit configured to, in response to determining that the number of coordinate data sets per unit area of the interest image of the captured image is smaller than the predetermined value when image capture is performed at the zoom ratio, control the encoding unit so as to perform encoding by allocating an amount of encoded data to each of encoding blocks in the interest image, the amount depending on a distance from an image center portion of a non-zoom image captured by the image capturing unit to the each of encoding blocks in the interest image.

8. The image processing apparatus according to claim 1, wherein the circuitry does not perform correction to correct the distortion of the interest image captured at the zoom ratio, in response to determining that the number of coordinate data sets per unit area of the interest image of the captured image is less than the predetermined value when image capture is performed at the zoom ratio.

* * * * *